(12) United States Patent
Jeong et al.

(10) Patent No.: US 8,140,671 B2
(45) Date of Patent: Mar. 20, 2012

(54) APPARATUS AND METHOD FOR SAMPLING SECURITY EVENTS BASED ON CONTENTS OF THE SECURITY EVENTS

(75) Inventors: Chi Yoon Jeong, Daejeon (KR); Beom Hwan Chang, Daejeon (KR); Seon Gyoung Sohn, Daejeon (KR); Geon Lyang Kim, Daejeon (KR); Jong Hyun Kim, Daejeon (KR); Jong Ho Ryu, Cheonan (KR); Jung Chan Na, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 104 days.

(21) Appl. No.: 12/667,130

(22) PCT Filed: Nov. 19, 2007

(86) PCT No.: PCT/KR2007/005797
§ 371 (c)(1),
(2), (4) Date: Dec. 29, 2009

(87) PCT Pub. No.: WO2009/005187
PCT Pub. Date: Jan. 8, 2009

(65) Prior Publication Data
US 2011/0016208 A1   Jan. 20, 2011

(30) Foreign Application Priority Data
Jul. 4, 2007   (KR) .......................... 10-2007-0067268

(51) Int. Cl.
*G06F 15/173* (2006.01)
(52) U.S. Cl. ....................................... 709/224; 709/238
(58) Field of Classification Search .................. 709/224, 709/238
See application file for complete search history.

(56) References Cited

U.S. PATENT DOCUMENTS
7,454,790 B2 * 11/2008 Potok ............................. 726/23
(Continued)

FOREIGN PATENT DOCUMENTS
KR       1020010085057       9/2001
(Continued)

OTHER PUBLICATIONS

B.-Y. Choi et al., "Adaptive Packet Sampling for Accurate and Scalable Flow Measurement," *Proceedings of the Global Telecommunications Conference 2004* (*Globecom 2004*), vol. 3, pp. 1448-1452, Nov. 29-Dec. 3, 2004, Dallas, Texas, paper presented on Dec. 1, 2004.

(Continued)

*Primary Examiner* — Hussein A. Elchanti
(74) *Attorney, Agent, or Firm* — NSIP Law

(57) ABSTRACT

There are provided an apparatus and method for sampling a security event based on contents of the security event, the apparatus including: a security event accumulation module collecting security events occurring in a network system and storing the security events for each type according to contents of the security event; a security event analysis module calculating distribution of the security events for each type by analyzing the stored security events; and a security event extraction module sampling the stored security events according to the calculated distribution of the security events for each type. The apparatus and method may improve speed of visualization of a security event and a security event analysis apparatus and may increase accuracy thereof.

15 Claims, 4 Drawing Sheets

U.S. PATENT DOCUMENTS

| | | | |
|---|---|---|---|
| 7,539,857 B2 * | 5/2009 | Bartlett et al. | 713/152 |
| 7,659,922 B2 * | 2/2010 | Black et al. | 348/143 |
| 7,676,841 B2 * | 3/2010 | Sobchuk et al. | 726/23 |
| 7,958,267 B1 * | 6/2011 | Eiras et al. | 709/246 |

FOREIGN PATENT DOCUMENTS

| | | |
|---|---|---|
| KR | 1020020062070 | 7/2002 |
| KR | 1020040092314 | 11/2004 |
| KR | 1020060042788 | 5/2006 |
| KR | 1020060063564 | 6/2006 |
| WO | WO-00/05852 A1 | 2/2000 |

OTHER PUBLICATIONS

International Search Report issued on Mar. 10, 2008, in counterpart International Application. No. PCT/KR2007/005797 (2 pages, in English).

* cited by examiner

APPARATUS AND METHOD FOR SAMPLING SECURITY EVENTS BASED ON CONTENTS OF THE SECURITY EVENTS

RELATED APPLICATIONS

This application is a 35 U.S.C. §371 national stage filing of PCT Application No. PCT/KR2007/005797 filed on Nov. 19, 2007, which claims priority to, and the benefit of, Korean Patent Application No. 10-2007-0067268 filed on Jul. 4, 2007. The contents of the aforementioned applications are hereby incorporated by reference.

TECHNICAL FIELD

The present invention relates to a security event sampling apparatus and method to protect characteristic information of security events, and more particularly, to an apparatus and method for sampling a security event received from a network system by using contents of the security event to protect characteristic information of the security event.

The work related to the present invention was partly supported by the IT R&D program of MIC/IITA [2005-S-022-01, Title: The Development of Smart Monitoring and Tracing System against Cyber-attack in AII-IP Network].

BACKGROUND ART

Recently, as sampling methods used in collecting and analyzing security events on a network, there are a systematic sampling method extracting security events at regular intervals, a random sampling method randomly extracting a security event from security events, and a stratified random sampling method dividing security events into homogeneous layers and randomly extracting from the homogeneous layers.

In association with this, there is Korean Patent Application No. 10-2005-032363 entitled "Apparatus for Collecting Internet Protocol Packets, Which Has Sampling and Signature Retrieving Functions and a Method Therefore, Particularly Capable of Reducing a Lot of Computing Resources Required for Collecting Traffic on High-Speed Internet Lines, and Effectively Constructing a Monitoring System Capable of Conducting More Exact Real-Time Analysis," which embodies sampling function and signature searching function in hardware and supports periodical sampling, random sampling, and hash-based sampling to improve performance of sampling. However, there is still a problem of distortions of content characteristics of security events before and after sampling.

Generally, contents of security events include a source Internet protocol (IP) address, a destination IP address, a source port, a destination port, and a protocol. Distribution of information included in the contents of the security events becomes important characteristics to determine a security state of a network.

Also, cyber attacks presently performed on a network use a method of fixing both of a source port and a destination port, a method of fixing a source port and randomly varying a destination port, and a method of randomly varying both of a source port and a destination port. Accordingly, distribution of a relation between a source port and a destination port plays an important role in analyzing and visualizing a cyber attack state.

Since security events are sampled without using content characteristic information of the security events in conventional sampling methods, content characteristics of security events after sampling become different from content characteristics of security events prior to sampling. That is, when sampling without using contents of security events, information on distribution of a relation between a source port and destination port is damaged, thereby deteriorating performance of a network visualization and analysis apparatus.

DISCLOSURE OF INVENTION

Technical Problem

An aspect of the present invention provides a security event sampling apparatus and method capable of maintaining content characteristic information of security events prior to sampling and content characteristic information after the sampling to be identical without change when sampling security events received from network systems existing on a network.

Technical Solution

According to an aspect of the present invention, there is provided an apparatus for sampling a security event based on contents of the security event, the apparatus including: a security event accumulation module collecting security events occurring in a network system and storing the security events for each type according to contents of the security event; a security event analysis module calculating distribution of the security events for each type by analyzing the stored security events; and a security event extraction module sampling the stored security events according to the calculated distribution of the security events for each type.

The apparatus may further include a security event storage unit having a plurality of storage areas storing the security events for each type.

The apparatus may further include a sampling ratio determination module determining a sampling ratio in proportion to processing performance of a system and an average number of received security events per second for a set T amount of time.

According to another aspect of the present invention, there is provided a method of sampling a security event based on contents of the security event, the method including: collecting security events occurring in a network system; classifying and storing the security events for each type according to a relation between a source port and a destination port of contents of the collected security event; analyzing the number of the security events stored for each type and calculating a port relation distribution; and sampling the security event by using the calculated port relation distribution.

The method may further include determining a sampling ratio of the security event by comparing the set maximum number of the processed the security events for each stage and an average number of security events received per second for a T amount of time, before the calculating the port relation distribution.

BEST MODE FOR CARRYING OUT THE INVENTION

Figure 1:
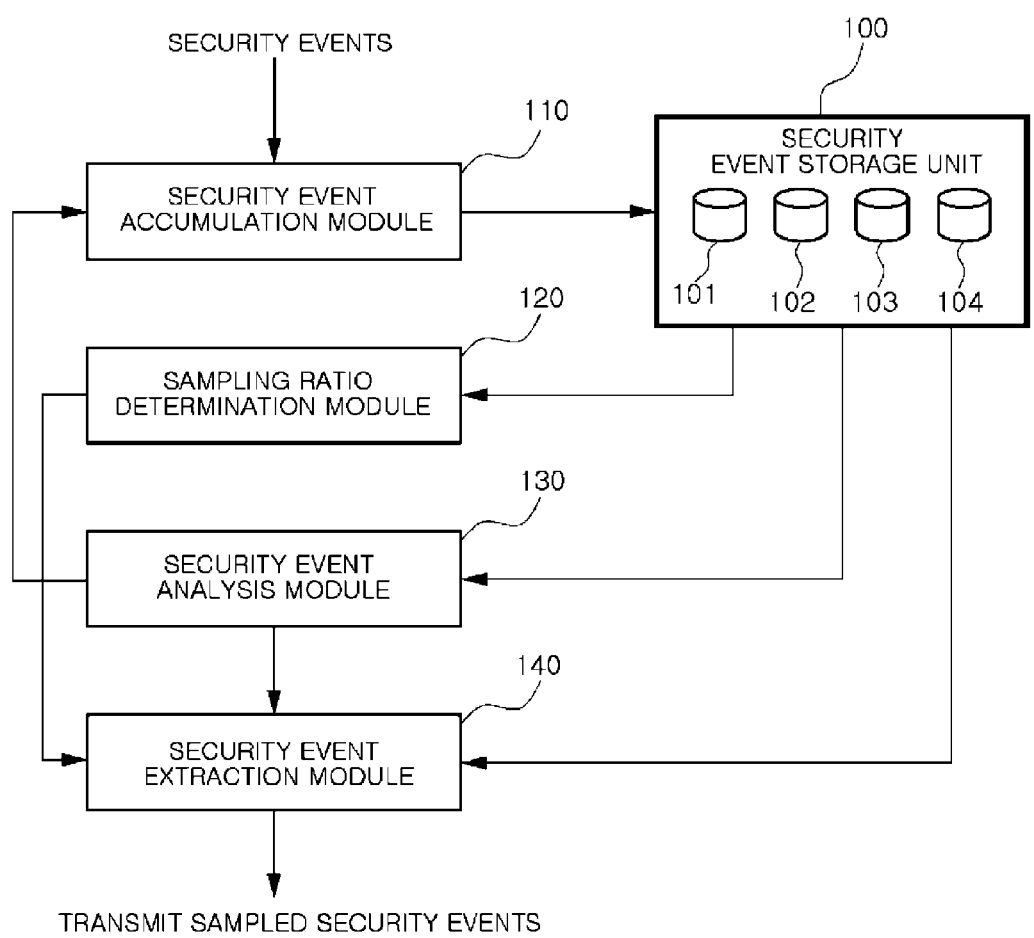
FIG. 1 is a diagram illustrating an apparatus for sampling security events based on contents of the security events, according to an exemplary embodiment of the present invention.

Hereinafter, exemplary embodiments of the present invention will now be described in detail with reference to the accompanying drawings.

Only, in describing operations of the exemplary embodiments in detail, when it is considered that a detailed description on related well-known functions or constitutions unnecessarily may make essential points of the present invention be unclear, the detailed description will be omitted.

In the drawings, the same reference numerals are used throughout to designate the same or similar components.

Throughout the specification, when it is describe that a part is "connected to" another part, this includes not only a case of "being directly connected to" but also a case of "being electrically connected to" interposing another device therebetween.

Also, when it is described that an apparatus "includes" an element while there is no opposite description thereof, this is not designate that the apparatus excludes other elements but designates that the apparatus may further include other elements.

The term of "module" indicates a unit for processing a certain function or operation, which can be embodied by software, hardware, or a combination of software and hardware.

FIG. 1 is a diagram illustrating an apparatus for sampling security events based on contents of the security events, according to an exemplary embodiment of the present invention.

Referring to FIG. 1, the apparatus includes a security event storage unit 100, a security event accumulation module 110, a sampling ratio determination module 120, a security event analysis module 130, and a security event extraction module 140.

The security event accumulation module 110 collects security events generated from a network system existing in a network, classifies the collected security events into a plurality of types according to contents of the security events, and stores the classified security events in respective memories 101 to 104 of the security event storage unit 100.

That is, in the respective memories 101 to 104 of the security event storage unit 100, there are stored only security events corresponding to four types classified by the security event analysis module 130 according to a port relation between a source port and a destination port in the contents.

In this case, contents of a security event include a source Internet Protocol (IP) address, a source port, a destination IP address, a destination port, and a protocol. The contents are important to determine a security state of a network.

Accordingly, in the present invention, there is used a port relation distribution where security events are classified for each port relation between the source port and the destination port in the contents of the security event. Also, instead of the port relation distribution, there may be used an IP address relation distribution where IP addresses are classified for each country or domain.

Also, the sampling ratio determination module 120 determines a sampling ratio by comparing an average number of security events received per second for a preset T amount of time with a maximum number of processed security events, which is previously defined security event processing performance of a system for each stage. A process of determining the sampling ratio by the sampling ratio determination module 120 will be described in detail with reference to FIG. 3.

The security event analysis module 130 calculates a port relation distribution by analyzing a number of security events stored in the respective memories 101 to 104. That is, the security event analysis module 130 calculates the port relation distribution by calculating an existence ratio of the number of security events stored in the respective memories 101 to 104 with respect to a number of overall security events.

Also, the security event analysis module 130 sets and previously defines a type of a security event according to a port relation between a source port and a destination port in contents of the security event in such a way that the security event accumulation module 110 stores the security events in a plurality of storage areas in the security event storage unit 100. A process of calculating the port relation distribution by the security event analysis module 130 will be described in detail with reference to FIG. 4.

The security event extraction module 140 extracts and samples security events by using the sampling ratio determined by the sampling ratio determination module 120 and the port relation distribution calculated by the security event analysis module 130 and transmits the sampled security events.

Figure 2:
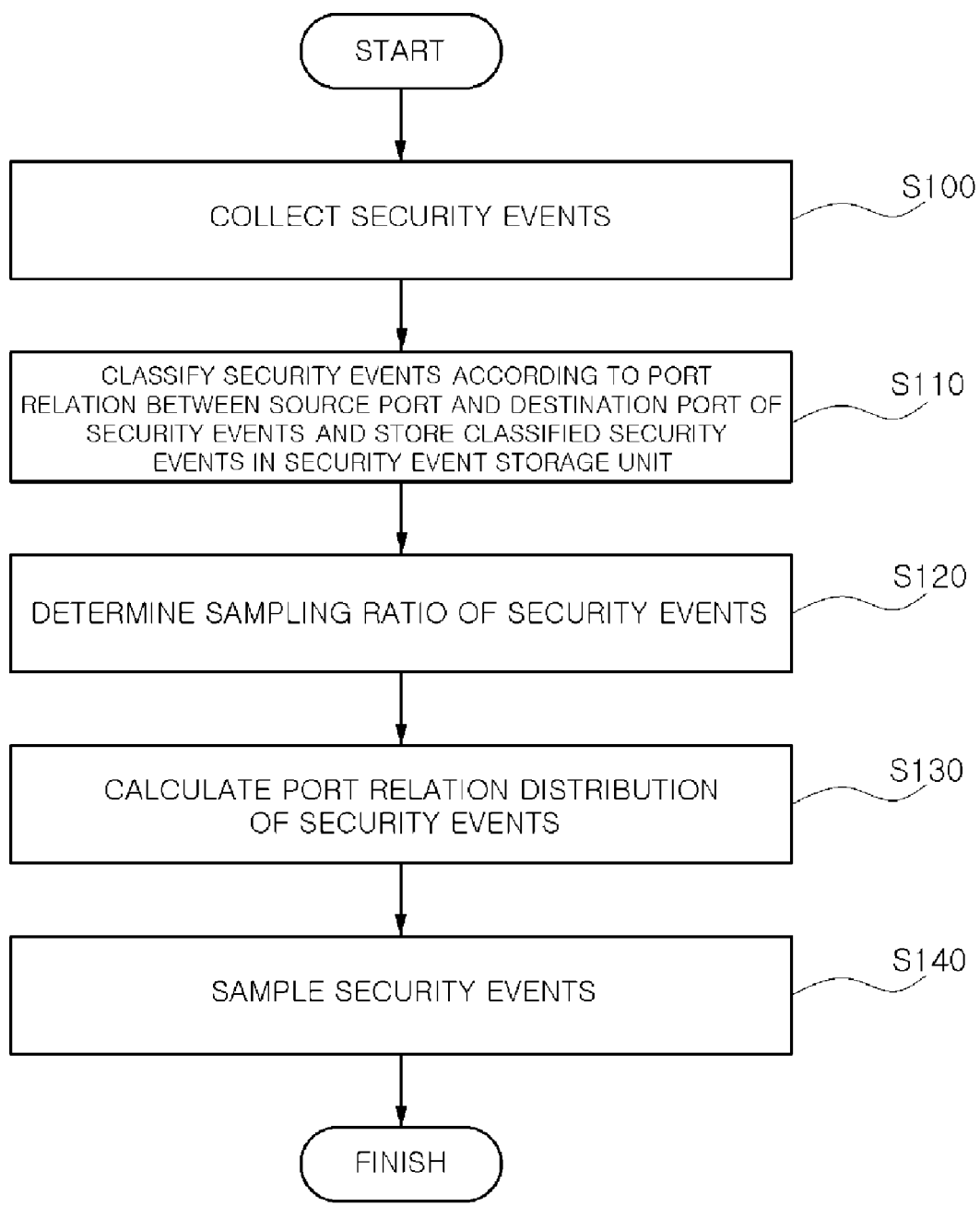
FIG. 2 is a flowchart illustrating a method of sampling security events based on contents of the security events, according to an exemplary embodiment of the present invention.

FIG. 2 is a flowchart illustrating a method of sampling security events based on contents of the security events, according to an exemplary embodiment of the present invention.

Referring to FIG. 2, the security event accumulation module 110 collects security events from network systems present in a network (S100).

The security event accumulation module 110 classifies the security events for each type according to a port relation between a source port and destination port in contents of the collected security event and stores the classified security events in respective memories 101 to 104 of the security event storage unit 100.

In this case, each type of security events stored in each of the memories 101 to 104 of the security event storage unit 100 is previously defined by the security event analysis module 130. For example, based on well-known 1024 port, there are four types of the port relation between a source port and destination port.

Instead of the well-known 1024 port, a security event type may be defined by classifying IP addresses for each country or domain.

The sampling ratio determination module 120 determines a sampling ratio of the security events by comparing an average number A of received security events per second for a T amount of time set by a user with a maximum number of processing security events, which is based on a previously defined security event processing performance of a system for each of a plurality of stages (S120).

The security event analysis module 130 calculates a port relation distribution of the security events by analyzing a number of security events for each type stored in each of the memories 101 to 104 of the security event storage unit 100 (S130).

The security event extraction module 140 samples the security events stored in the security event storage unit 100 by using the sampling ratio determined by the sampling ratio determination module 120 and the port relation distribution calculated by the security event analysis module 130 (S140).

On the other hand, in the present invention, the sampling ratio may be fixed without performing S120.

Figure 3:
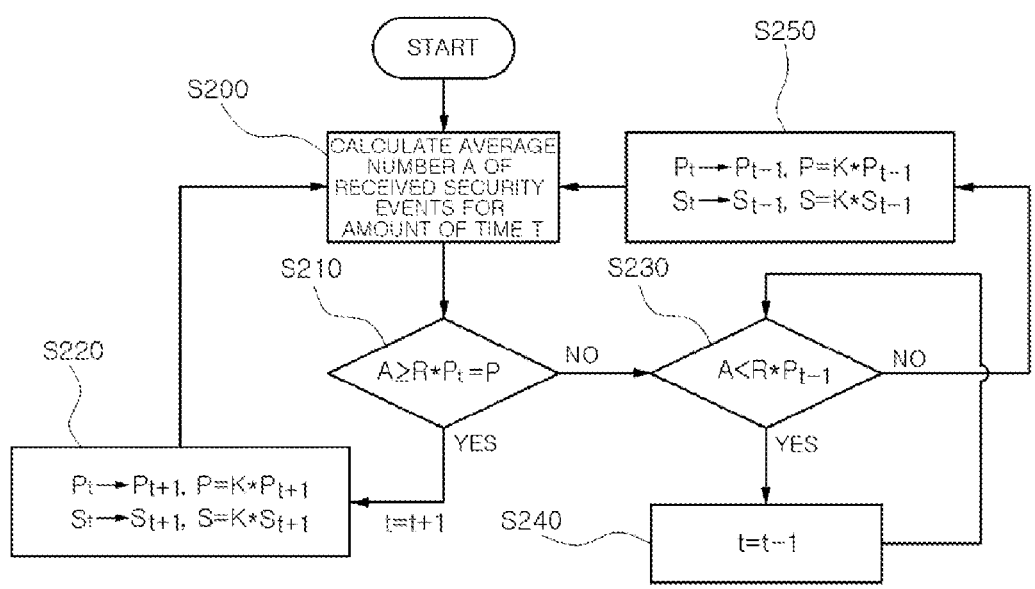
FIG. 3 is a flowchart illustrating an algorithm of determining a sampling ratio of a sampling ratio determination module, according to an exemplary embodiment of the present invention.

FIG. 3 is a flowchart illustrating the process where the sampling ratio determination module 120 determines the sampling ratio by comparing the average number of received security events per second for a T amount of time with the maximum number of processing security events, which is based on the previously defined security event processing performance of the system for each stage.

To sample the security events suitably according to system performance, a maximum number of security events capable of being processed for each stage of security event processing performance of the system is defined. An initial value of the maximum number P of presently-processing security events in the system is based on a number Pt of processing security events at a t stage corresponding to a present security event processing performance of the system (P=R*Pt, R is a constant).

As described above, in a state where a maximum number P of processing security events for each stage of security event processing performance of the system is determined, when collecting a number of security events is finished, the sampling ratio determination module 120 calculates the average number A of the received security events per second for the T amount of time set by the user by using a number of security events received during the T amount of time (S200).

After that, it is checked whether the average number A of the received security events per second is identical to or greater than the maximum number P of processing security events presently set in the system (P=R*Pt, R is a constant) (S210).

As a result of the checking in S210, when the average number A of the received security events per second is identical to or greater than the maximum number P of processing security events (P=R*Pt, R is a constant), a sampling ratio S is increased from the t stage to a t+1 stage among the stages of security event processing performance of a system. In addition, the maximum number P of processing security events is increased to from the t stage to the t+1 stage.

Accordingly, the sampling ratio S and the maximum number P of processing security events are changed to S=K*St+1 and P=K*Pt+1 (K is a constant) (S220).

On the other hand, as a result of the checking in S210, when the average number A of the received security events per second is not identical and not greater than the maximum number P of processing security events (P=R*Pt, R is a constant), it is checked whether the average number A of the received security events per second is less than a maximum number P of processing security events corresponding to a t−1 stage lower than the t stage (P=R*Pt-1, R is a constant) (S230).

As a result of the checking in S230, when the average number A of the received security events is less than the maximum number P of processing security events at the t−1 stage, lower stages are searched by comparing a maximum P of processing security events at each of the lower stages t−2, t−3, . . . , and t−n (substitute t=t−1) with the average number A of the received security events while decreasing the level of the stage (S240).

As a result of the searching in S240, when the average number A of the received security events is no longer less than the maximum number P of processing security events at the t−n stage, the sampling ratio S and the maximum number P of processing security events are changed to S=K*St−n and P=K*Pt−n (K is a constant) to be suitable for the t−n stage (S250).

According to this, a suitable sampling ratio is set to according to a security event processing performance of the system.

Figure 4:
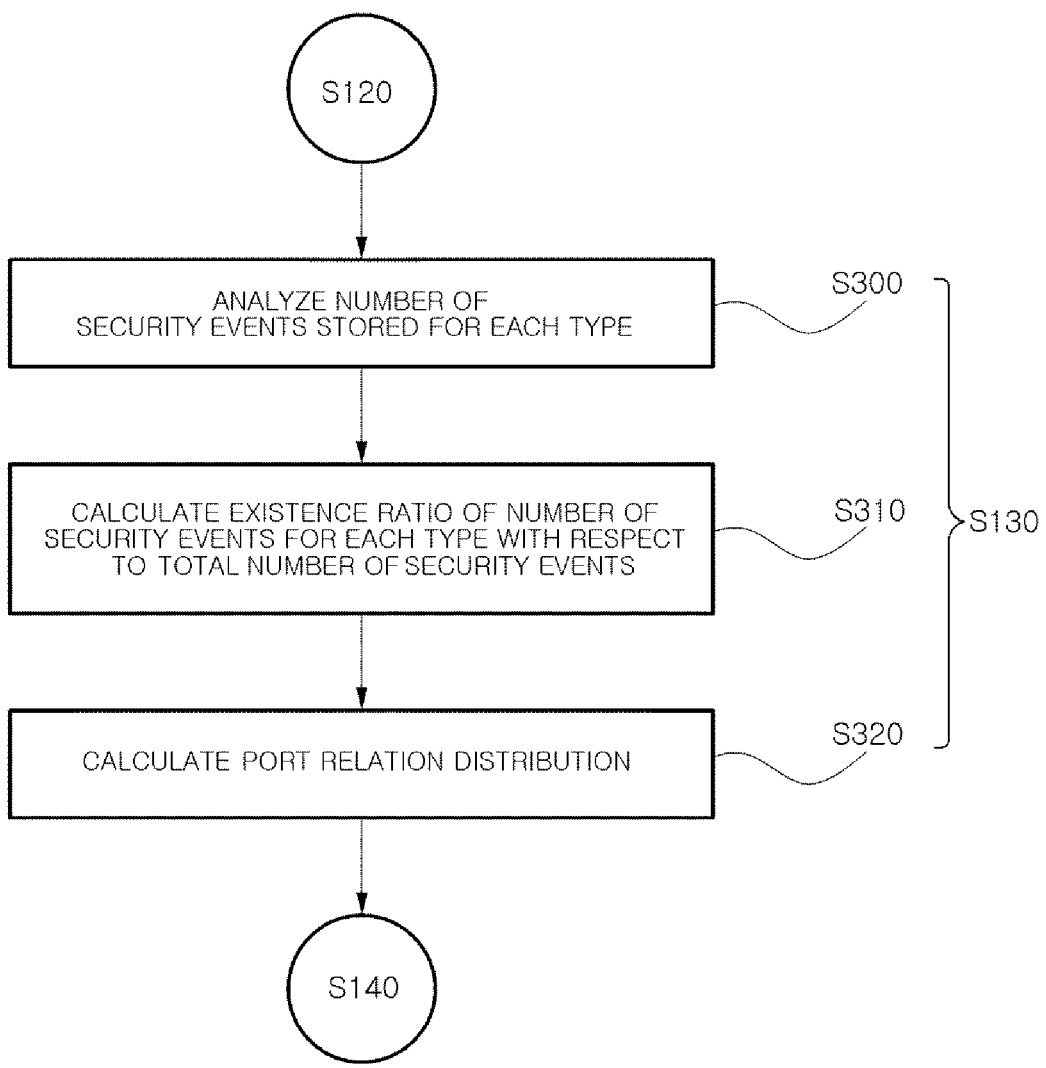
FIG. 4 is a flowchart illustrating a process of calculating a port relation distribution with respect to security events stored for each type in a security event analysis module, according to an exemplary embodiment of the present invention.

FIG. 4 is a flowchart illustrating a detailed process where the security event analysis module 130 calculates a port relation distribution by analyzing a number of security events stored in each of the memories 101 to 104 of the security event storage unit 100.

Generally, there occur a lot of network attacks of a type of randomly varying a source port or a destination port smaller than the well-known 1024 port or randomly varying both of the source port and destination port while performing the network attack.

Also, since most of the cases when both of the source port and the destination port are smaller than the well-known 1024 port are normal network traffic a very important characteristic of a security event is whether both of the source port and the destination port are both smaller than the well-known 1024 port.

Accordingly, the security event analysis module 130 defines a type of a security event based on the 1024 port as one of the following four types.

(1) A case where both of a source port and destination port are smaller than the 1024 port, (2) A case where a source port is smaller than the 1024 port and a destination port is greater than the 1024 port, (3) A case where a source port is greater than the 1024 port and a destination port is smaller than the 1024 port, (4) A case where both of a source port and destination port are greater than the 1024 port, Accordingly, the security event accumulation module 110 classifies received security events according to the four types defined as described above and stores the security events in the respective memories 101 to 104 of the security event storage unit 100.

Then, the security event analysis module 130 analyzes a number of security events for each type present in the four memories 101 to 104 of the security event storage unit 100 (S300), calculates an existence ratio of the number of security events for each type with respect to a number of overall security events (S310), and calculates a port relation distribution X (S320).

For example, when the numbers of security events corresponding to four types such as (1), (2), (3), and (4) stored in the four memories 101 to 104 of the security event storage unit 100 are 10, 20, 40, and 30, respectively, since a port relation distribution X of the security events is an existence ratio (10/100, 20/100, 40/100, and 30/100) of each of the types with respect to a number of overall security events (10+20+40+30=100), the port relation distribution X becomes {0.1, 0.2, 0.4, and 0.3}.

Accordingly, as a result of calculating the port relation distribution X, since a number of the security events of type (3) is largest, sampling is performed in such a way that a number of the security events of type (3) is largest when transmitting the security events after sampling.

The invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion.

Also, functional programs, codes, and code segments for accomplishing the present invention can be easily construed by programmers skilled in the art to which the present invention pertains.

While the present invention has been shown and described in connection with the exemplary embodiments, it will be apparent to those skilled in the art that modifications and variations can be made without departing from the spirit and scope of the invention as defined by the appended claims.

The invention claimed is:

1. An apparatus for sampling security events based on contents of the security events, the apparatus comprising:
   a security event accumulation module configured to collect security events occurring in a network system and store the security events for each of a plurality of types of security events according to contents of the security events;
   a security event analysis module configured to calculate a distribution of the security events for each type by analyzing the stored security events; and
   a security event extraction module configured to sample the stored security events according to the calculated distribution of the security events for each type;
   wherein the security event accumulation module, or the security event analysis module, or the security event extraction module, or any combination thereof, is implemented by hardware and/or a combination of software and hardware.

2. The apparatus of claim 1, wherein the contents of the security events comprise a source Internet Protocol (IP) address, a destination IP address, a source port, a destination port, and a protocol.

3. The apparatus of claim 1, further comprising a security event storage unit comprising a plurality of storage areas configured to store the security events for each type.

4. The apparatus of claim 3, wherein the security event analysis module is further configured to:
   analyze a number of the security events stored in the plurality of storage areas, areas;
   obtain an existence ratio of the security events for each type stored in each of the plurality of storage areas with respect to a total number of the stored security events for all types; and
   calculate a port relation distribution from the existence ratio of the security events for each type.

5. The apparatus of claim 1, wherein the security event accumulation module is further configured to classify the security events into four types based on a port 1024 with respect to a source port and a destination port of the contents of the security events.

6. The apparatus of claim 5, wherein the four types comprise:
   a type where both the source port and the destination port are smaller than the port 1024;
   a type where the source port is smaller than the port 1024 and the destination port is greater than the port 1024;
   a type where the source port is greater than the port 1024 and the destination port is smaller than the port 1024; and
   a type where both the source port and the destination port are greater than the port 1024.

7. The apparatus of claim 1, wherein the security event accumulation module is further configured to classify the security events into the plurality of types based on a source Internet Protocol (IP) address and a destination IP address of the contents of the security events.

8. The apparatus of claim 1, further comprising a sampling ratio determination module configured to determine a sampling ratio according to a security event processing performance of the apparatus and an average number of received security events per second for a set amount of time T.

9. The apparatus of claim 8, wherein the security event processing performance of the apparatus is divided into a plurality of stages;
   a maximum number P of processing security events and a sampling ratio are set for each of the stages; and
   the sampling ratio determination module is further configured to:
      compare the average number of received security events per second for the set amount of time T with the maximum number P of processing security events at a plurality of the stages beginning with a current stage to find a stage at which the average number of the received security events per second for the set amount of time T is not less than the maximum number P of processing security events at the stage; and
      setting the sampling ratio of the sampling ration determination module to the sampling ratio of the stage found as a result of the comparing.

10. The apparatus of claim 8, wherein the security event extraction module is further configured to sample the security events according to the distribution of the security events for each type calculated by the security event analysis module and the sampling ratio determined by the sampling ratio determination module.

11. A method of sampling security events based on contents of the security events, the method comprising:
   collecting security events occurring in a network system;
   classifying the collected security events for each of a plurality of types of security events according to a port relation between a source port and a destination port of contents of the collected security events;
   storing the classified security events for each type;
   analyzing a number of the security events stored for each type;
   calculating a port relation distribution based on the number of the security events stored for each type and a total number of security events stored for all types; and
   sampling the stored security events based on the calculated port relation distribution;
   wherein the collecting of security events, or the classifying of the collected security events, or the storing of the classified security events, or the analyzing of a number of the security events, or the calculating of a port relation distribution, or the sampling of the stored security events, or any combination thereof, is performed by hardware and/or a combination of software and hardware.

12. The method of claim 11, wherein the classifying of the collected security events comprises classifying the security events into four types based on a port 1024, the four types comprising:
   a type where both of the source port and the destination port are smaller than the port 1024;
   a type where the source port is smaller than port 1024 and the destination port is greater than the port 1024;

a type where the source port is greater than port 1024 and the destination port is smaller than the port 1024; and a type where both the source port and the destination port are greater than the port 1024.

13. The method of claim 11, further comprising, before the calculating of a port relation distribution:

dividing a security event processing performance of a system in which the method is being performed into a plurality of stages;

setting a maximum number P of processing security events and a sampling ratio for each of the stages; and determining a sampling ratio of the stored security events by comparing an average number of security events received per second for a set amount of time T with the maximum number P of processing security events at a plurality of stages beginning with at stage that is a current stage.

14. The method of claim 13, wherein the determining of a sampling ratio of the stored security events comprises:

calculating the average number A of security events received per second for the set amount of time T;

checking whether the average number A of security events received per second for the set amount of time T is greater than the maximum number P of processing security events at the t stage; and increasing the sampling ratio and the maximum number P of processing security events from the t stage to a t+1 stage higher than the t stage when the average number A of security events received per second for the set amount of time T is greater than the maximum number P of processing security events at the t stage as a result of the checking.

15. The method of claim 14, wherein the determining of a sampling ratio of the security events further comprises:

checking whether the average number A of security events received per second for the set amount of time T is less than a maximum number P of processing security events at a t−1 stage lower than the t stage when the average number A of security events received per second is not greater than the maximum number P of processing security events at the t stage;

decreasing the sampling ratio and the maximum number P of processing security events from the t stage to the t−1 stage when the average number A of the security events received per second for the set amount of time T is not less than the maximum number P of processing security events at the t−1 stage;

searching for a t−n stage lower than the t−1 stage at which the average number A of the security events received per second is not less than the maximum number P of processing security events at the t−n stage by successively comparing the average number A of the security events received per second for the set amount of time T with the maximum number P of processing security events for each stage from a t−2 stage to the t−n stage when the average number A of the security events received per second for the set amount of time T is less than the maximum number P of processing security events at the t−1 stage; and decreasing the sampling ratio and the maximum number P of processing security events from the t stage to the t−n stage when the t−n stage at which the average number A of the security events received per second for the set amount of time T is not less than the maximum number P of processing security events is found as a result of the searching.

* * * * *